US009946482B2

(12) United States Patent
Kilzer et al.

(10) Patent No.: US 9,946,482 B2
(45) Date of Patent: Apr. 17, 2018

(54) METHOD FOR ENLARGING DATA MEMORY IN AN EXISTING MICROPROCESSOR ARCHITECTURE WITH LIMITED MEMORY ADDRESSING

(71) Applicant: Microchip Technology Incorporated, Chandler, AZ (US)

(72) Inventors: Kevin Kilzer, Chandler, AZ (US); Joseph Julicher, Maricopa, AZ (US); Jacobus Albertus Van Eeden, Chandler, AZ (US)

(73) Assignee: MICROCHIP TECHNOLOGY INCORPORATED, Chandler, AZ (US)

( * ) Notice: Subject to any disclaimer, the term of this patent is extended or adjusted under 35 U.S.C. 154(b) by 0 days.

(21) Appl. No.: 15/209,543

(22) Filed: Jul. 13, 2016

(65) Prior Publication Data

US 2017/0017431 A1 Jan. 19, 2017

Related U.S. Application Data

(60) Provisional application No. 62/192,434, filed on Jul. 14, 2015.

(51) Int. Cl.
*G06F 12/06* (2006.01)
*G06F 3/06* (2006.01)
(Continued)

(52) U.S. Cl.
CPC .......... *G06F 3/0631* (2013.01); *G06F 3/0604* (2013.01); *G06F 3/0659* (2013.01);
(Continued)

(58) Field of Classification Search
None
See application file for complete search history.

(56) References Cited

U.S. PATENT DOCUMENTS 6,029,241 A * 2/2000 Wojewoda .......... G06F 9/30098
712/32
6,260,101 B1 * 7/2001 Hansen ............... G06F 12/0623
710/22
(Continued)

OTHER PUBLICATIONS

Microchip Technology Incorporated, "PICmicro™ Mid-Range MCU Family Reference Manual," URL: http://ww1.microchip.com/downloads/en/DeviceDoc/31000a.pdf, 12 pages, Dec. 1997.
(Continued)

*Primary Examiner* — John A Lane
(74) *Attorney, Agent, or Firm* — Slayden Grubert Beard PLLC (57) ABSTRACT

A method for expanding a data memory for a microprocessor architecture which uses a bank select accessing scheme for accessing data memory which is divided into a plurality of memory banks. A bank select register is configured to select a memory bank and the microprocessor architecture has an instruction set with a dedicated instruction for selecting a memory bank. An opcode of the dedicated bank select instruction provides for a maximum of n bits payload thereby providing for an address value which is configured to select a maximum of $2^n$ memory banks. The method has the steps of: using an opcode of a test instruction that provides for m bits of payload for a new bank select instruction, wherein m>n; and using an opcode of the dedicated bank select instruction for a new test instruction.

19 Claims, 12 Drawing Sheets

(51) Int. Cl.
*G06F 9/30* (2018.01)
*G06F 9/34* (2018.01)
*G06F 9/35* (2018.01)

(52) U.S. Cl.
CPC .......... *G06F 3/0679* (2013.01); *G06F 9/3012* (2013.01); *G06F 9/30101* (2013.01); *G06F 9/30145* (2013.01); *G06F 9/342* (2013.01); *G06F 9/35* (2013.01)

(56) References Cited

U.S. PATENT DOCUMENTS

| | | | |
|---|---|---|---|
| 2009/0138626 A1* | 5/2009 | Le | G06F 12/06 710/23 |
| 2009/0144511 A1 | 6/2009 | Julicher et al. | 711/1.54 |
| 2010/0205345 A1 | 8/2010 | Lundstrum et al. | 711/5 |

OTHER PUBLICATIONS

International Search Report and Written Opinion, Application No. PCT/US2016/042203, 10 pages, dated Oct. 24, 2016.

* cited by examiner

| Mnemonic, Operands | | Description | Cycles | 14-Bit Opcode MSb ........ LSb | Status Affected | Notes |
|---|---|---|---|---|---|---|
| BYTE-ORIENTED FILE REGISTER OPERATIONS | | | | | | |
| ADDWF | f, d | Add W and f | 1 | 00 0111 dfff ffff | C, DC, Z | 2 |
| ADDWFC | f, d | Add with Carry W and f | 1 | 11 1101 dfff ffff | C, DC, Z | 2 |
| ANDWF | f, d | AND W with f | 1 | 00 0101 dfff ffff | Z | 2 |
| ASRF | f, d | Arithmetic Right Shift | 1 | 11 0111 dfff ffff | C, Z | 2 |
| LSLF | f, d | Logical Left Shift | 1 | 11 0101 dfff ffff | C, Z | 2 |
| LSRF | f, d | Logical Right Shift | 1 | 11 0110 dfff ffff | C, Z | 2 |
| CLRF | f | Clear f | 1 | 00 0001 1fff ffff | Z | 2 |
| CLRW | — | Clear W | 1 | 00 0001 0000 00xx | Z | |
| COMF | f, d | Complement f | 1 | 00 1001 dfff ffff | Z | 2 |
| DECF | f, d | Decrement f | 1 | 00 0011 dfff ffff | Z | 2 |
| INCF | f, d | Increment f | 1 | 00 1010 dfff ffff | Z | 2 |
| IORWF | f, d | Inclusive OR W with f | 1 | 00 0100 dfff ffff | Z | 2 |
| MOVF | f, d | Move f | 1 | 00 1000 dfff ffff | Z | 2 |
| MOVWF | f | Move W to f | 1 | 00 0000 1fff ffff | | 2 |
| RLF | f, d | Rotate Left f through Carry | 1 | 00 1101 dfff ffff | C | 2 |
| RRF | f, d | Rotate Right f through Carry | 1 | 00 1100 dfff ffff | C | 2 |
| SUBWF | f, d | Subtract W from f | 1 | 00 0010 dfff ffff | C, DC, Z | 2 |
| SUBWFB | f, d | Subtract with Borrow W from f | 1 | 11 1011 dfff ffff | C, DC, Z | 2 |
| SWAPF | f, d | Swap nibbles in f | 1 | 00 1110 dfff ffff | | 2 |
| XORWF | f, d | Exclusive OR W with f | 1 | 00 0110 dfff ffff | Z | 2 |
| BYTE ORIENTED SKIP OPERATIONS | | | | | | |
| DECFSZ | f, d | Decrement f, Skip if 0 | 1(2) | 00 1011 dfff ffff | | 1, 2 |
| INCFSZ | f, d | Increment f, Skip if 0 | 1(2) | 00 1111 dfff ffff | | 1, 2 |
| BIT-ORIENTED FILE REGISTER OPERATIONS | | | | | | |
| BCF | f, b | Bit Clear f | 1 | 01 00bb bfff ffff | | 2 |
| BSF | f, b | Bit Set f | 1 | 01 01bb bfff ffff | | 2 |
| BIT-ORIENTED SKIP OPERATIONS | | | | | | |
| BTFSC | f, b | Bit Test f, Skip if Clear | 1(2) | 01 10bb bfff ffff | | 1, 2 |
| BTFSS | f, b | Bit Test f, Skip if Set | 1(2) | 01 11bb bfff ffff | | 1, 2 |
| LITERAL OPERATIONS | | | | | | |
| ADDLW | k | Add literal and W | 1 | 11 1110 kkkk kkkk | C, DC, Z | |
| ANDLW | k | AND literal with W | 1 | 11 1001 kkkk kkkk | Z | |
| IORLW | k | Inclusive OR literal with W | 1 | 11 1000 kkkk kkkk | Z | |
| MOVLB | k | Move literal to BSR | 1 | 00 0001 01kk kkkk | | |
| MOVLP | k | Move literal to PCLATH | 1 | 11 0001 1kkk kkkk | | |
| MOVLW | k | Move literal to W | 1 | 11 0000 kkkk kkkk | | |
| SUBLW | k | Subtract W from literal | 1 | 11 1100 kkkk kkkk | C, DC, Z | |
| XORLW | k | Exclusive OR literal with W | 1 | 11 1010 kkkk kkkk | Z | |

Note 1: If the Program Counter (PC) is modified, or a conditional test is true, the instruction requires two cycles. The second cycle is executed as a NOP.

2: If this instruction addresses an INDF register and the MSb of the corresponding FSR is set, this instruction will require one additional instruction cycle.

*Figure 3A*

| Mnemonic, Operands | | Description | Cycles | 14-Bit Opcode | | Status Affected | Notes |
|---|---|---|---|---|---|---|---|
| | | | | MSb | LSb | | |
| CONTROL OPERATIONS | | | | | | | |
| BRA | k | Relative Branch | 2 | 11 | 001k kkkk kkkk | | |
| BRW | – | Relative Branch with W | 2 | 00 | 0000 0000 1011 | | |
| CALL | k | Call Subroutine | 2 | 10 | 0kkk kkkk kkkk | | |
| CALLW | – | Call Subroutine with W | 2 | 00 | 0000 0000 1010 | | |
| GOTO | k | Go to address | 2 | 10 | 1kkk kkkk kkkk | | |
| RETFIE | k | Return from interrupt | 2 | 00 | 0000 0000 1001 | | |
| RETLW | k | Return with literal in W | 2 | 11 | 0100 kkkk kkkk | | |
| RETURN | – | Return from Subroutine | 2 | 00 | 0000 0000 1000 | | |
| INHERENT OPERATIONS | | | | | | | |
| CLRWDT | – | Clear Watchdog Timer | 1 | 00 | 0000 0110 0100 | TO, PD | |
| NOP | – | No Operation | 1 | 00 | 0000 0000 0000 | | |
| OPTION | – | Load OPTION_REG register with W | 1 | 00 | 0000 0110 0010 | | |
| RESET | – | Software device Reset | 1 | 00 | 0000 0000 0001 | | |
| SLEEP | – | Go into Standby or IDLE mode | 1 | 00 | 0000 0110 0011 | TO, PD | |
| TRIS | f | Load TRIS register with W | 1 | 00 | 0000 0110 0fff | | |
| C-COMPILER OPTIMIZED | | | | | | | |
| ADDFSR | n, k | Add Literal k to FSRn | 1 | 11 | 0001 0nkk kkkk | | |
| MOVIW | n mm | Move indirect FSRn to W with pre/post inc/dec modifier, mm | 1 | 00 | 0000 0001 0nxx | Z | 2, 3 |
| | k[n] | Move INDFn to W, indexed indirect | 1 | 11 | 1111 0nkk kkkk | Z | 2 |
| MOVWI | n mm | Move W to indirect FSRn with pre/post inc/dec modifier, mm | 1 | 00 | 0000 0001 1nxx | | 2, 3 |
| | k[n] | Move W to INDFn, indexed indirect | 1 | 11 | 1111 1nkk kkkk | | 2 |

Note 1: If the Program Counter (PC) is modified, or a conditional test is true, the instruction requires two cycles. The second cycle is executed as a NOP.

2: If this instruction addresses an INDF register and the MSb of the corresponding FSR is set, this instruction will require one additional instruction cycle.

3: See Table in the MOVIW and MOVWI instruction descriptions.

TABLE 3-10: PIC16F18857/77 MEMORY MAP BANK 60-61

TABLE 3-11: PIC16(L)F18857/77 MEMORY MAP, BANK 63

TABLE 3-14:  SPECIAL FUNCTION REGISTER SUMMARY BANKS 0-64 (ALL BANKS)

| Address | Name | Bit 7 | Bit 6 | Bit 5 | Bit 4 | Bit 3 | Bit 2 | Bit 1 | Bit 0 | Value on: POR, BOR | Value on all other Resets |
|---|---|---|---|---|---|---|---|---|---|---|---|
| All Banks | | | | | | | | | | | |
| 000h | INDF0 | Addressing this location uses contents of FSR0H/FSR0L to address data memory (not a physical register) | | | | | | | | xxxx xxxx | xxxx xxxx |
| 001h | INDF1 | Addressing this location uses contents of FSR1H/FSR1L to address data memory (not a physical register) | | | | | | | | xxxx xxxx | xxxx xxxx |
| 002h | PCL | Program Counter (PC) Least Significant Byte | | | | | | | | 0000 0000 | 0000 0000 |
| 003h | STATUS | — | — | — | TO | PD | Z | DC | C | ---1 1000 | ---q quuu |
| 004h | FSR0L | Indirect Data Memory Address 0 Low Pointer | | | | | | | | 0000 0000 | uuuu uuuu |
| 005h | FSR0H | Indirect Data Memory Address 0 High Pointer | | | | | | | | 0000 0000 | 0000 0000 |
| 006h | FSR1L | Indirect Data Memory Address 1 Low Pointer | | | | | | | | 0000 0000 | uuuu uuuu |
| 007h | FSR1H | Indirect Data Memory Address 1 High Pointer | | | | | | | | 0000 0000 | 0000 0000 |
| 008h | BSR | — | — | BSR5 | BSR4 | BSR3 | BSR2 | BSR1 | BSR0 | --00 0000 | --00 0000 |
| 009h | WREG | Working Register | | | | | | | | 0000 0000 | uuuu uuuu |
| 00Ah | PCLATH | — | Write Buffer for the upper 7 bits of the Program Counter | | | | | | | -000 0000 | -000 0000 |
| 00Bh | INTCON | GIE | PEIE | — | — | — | — | — | INTEDG | 00-- ---1 | 00-- ---1 |

Legend:  x = unknown, u = unchanged, q = depends on condition, - = unimplemented, read as '0', r = reserved. Shaded locations unimplemented, read as '0'.

Note 1: These Registers can be accessed from any bank.

METHOD FOR ENLARGING DATA MEMORY IN AN EXISTING MICROPROCESSOR ARCHITECTURE WITH LIMITED MEMORY ADDRESSING

RELATED PATENT APPLICATION

This application claims priority to commonly owned U.S. Provisional Patent Application No. 62/192,434; filed Jul. 14, 2015; which is hereby incorporated by reference herein for all purposes.

TECHNICAL FIELD

The present disclosure relates to microprocessor or microcontroller architecture, in particular to a bank select mechanism.

BACKGROUND

Bank selection mechanism is well known in the art of microprocessor architecture. It is usually applied in low cost systems that provide a limited number of bits in the instruction word and therefore have only a limited addressing capability. For example, if an instruction word is limited to provide a maximum of 7 bits for an address, a single instruction word can only address 128 memory locations. A bank select mechanism can be used to select a memory bank, for example a bank addressing 128 memory locations in the above mentioned example. The bank select register can be a separate register that may be memory mapped or it may be part of a status register in very low cost microprocessors or microcontrollers and only provide for 2 bits. An example for such a bank select register is the PIC16 family, see also "PICmicro™ Mid-Range MCU Family reference Manual", 1997 available from Microchip Technologies Inc. which is hereby incorporated by reference. The status register incorporates 2 bits for selecting one of four data memory banks and 1 bit for selecting one of two program memory banks. Thus, these type of microprocessors or microcontrollers are limited to a maximum of 4×128 bytes=512 bytes, wherein certain memory locations in the data memory are used to memory map special function registers which then further reduces the number of general purpose registers in the data memory to a maximum of typically around 368 bytes depending on the implementation.

SUMMARY

According to an embodiment, a method for expanding a data memory for a microprocessor architecture comprising a bank select accessing scheme for accessing data memory which is divided into a plurality of memory banks and a bank select register configured to select a memory bank and wherein the microprocessor architecture comprises an instruction set having a dedicated instruction for selecting a memory bank; wherein an opcode of the dedicated bank select instruction provides for a maximum of n bits payload thereby providing for an address value which is configured to select a maximum of $2^n$ memory banks, the method comprising the steps of: using an opcode of a test instruction that provides for m bits of payload for a new bank select instruction, wherein m>n; and using an opcode of the dedicated bank select instruction for a new test instruction.

According to a further embodiment, the test instruction is a Set Control instruction that updates simulation states in a simulation environment. According to a further embodiment, the Set Control instruction may execute as a no operation instruction during normal operation of the microprocessor. According to a further embodiment, n=5 and m=6. According to a further embodiment, at least a subset of the plurality of memory banks each comprises a plurality of core registers, a plurality of memory-mapped special function registers, a plurality of general purpose registers and a plurality of common general purpose registers, wherein the common general purpose registers and the core registers are mapped to each memory bank. According to a further embodiment, each of the memory banks provides address space for up to 12 core registers, up to 20 special function registers, up to 80 general purpose registers, and up to 16 common general purpose registers. According to a further embodiment, some memory banks comprise only core registers, special function registers, and common general purpose registers, wherein the common general purpose registers and the core registers are mapped to each memory bank. According to a further embodiment, some memory banks comprise only special function registers, and common general purpose registers, wherein the common general purpose registers are mapped to each memory bank. According to a further embodiment, some memory banks comprise only common general purpose registers, wherein the common general purpose registers are mapped to each memory bank. According to a further embodiment, a first subset of memory banks comprise core registers, special function registers, general purpose registers, and common general purpose registers, wherein a second subset of memory banks comprise only core registers, special function registers, and common general purpose registers, wherein a third subset of memory banks comprise only special function registers, and common general purpose registers, wherein a fourth subset of memory banks comprise only common general purpose registers, wherein the common general purpose registers and the core registers are mapped to each memory bank. According to a further embodiment, the entire data memory can be accessed through two concatenated indirect address registers. According to a further embodiment, a first indirect address register comprises a lower eight address bits and a second indirect address register comprises an upper 5 address bits. According to a further embodiment, the microprocessor architecture is implemented in a microcontroller comprising a plurality of peripherals which are controlled by special function registers, wherein the special function registers are memory mapped to the data memory. According to a further embodiment, the microcontroller comprises up to 1760 special function registers. According to a further embodiment, the data memory has a size of 4 kBytes.

BRIEF DESCRIPTION OF THE DRAWINGS

FIGS. 3A and 3B show an instruction set of an enhanced microprocessor core according to various embodiments.

FIG. 4A-4E show 64 memory banks and their mapping according to a specific embodiment.

FIG. 5A show details of memory banks 60, 61 and 63.

FIG. 5B shows two version of memory bank 62 for two different implementations.

DETAILED DESCRIPTION

There is a need for expanding the data memory or general purpose memory which is usually incorporated as SRAM, of these type of low cost 8-bit microprocessors or microcontrollers, e.g. the PIC16 family microcontrollers. These microcontrollers comprise an 8-bit central processing unit, and separate program and data memory and a plurality of peripherals. Various embodiments exist and differ in program memory size, data memory size, and implemented peripherals. Depending on the number of implemented peripherals a large number of special function registers is needed, wherein these control registers are typically memory-mapped to the data memory.

Typically, the design of such a low cost 8-bit microcontroller has a reduced size instruction words which limit the address range for the data memory. Thus, a banking scheme is used and each bank may have, for example, between 32 to 127 memory locations per bank depending on the design, in particular, the number of available bits for a direct address in the instruction. Due to the fact that the data memory is only directly accessible through a selected memory bank, only a subset of special function registers is directly accessible at a time. These microcontrollers have up to 32 banks, wherein according to one architecture, each bank comprises up to 80 bytes of general purpose data memory and the rest is reserved to core registers, special function registers and so-called common RAM which accesses 16 bytes of the data memory regardless which bank is selected. In summary, the amount of available general purpose memory locations in the RAM is therefore limited to an overall data memory size of around less than 2 kbytes.

However, there is a need for more data memory for these types of microcontrollers. Such an implementation requires instruction set compatibility with the older design.

According to an embodiment, a data memory for a microprocessor architecture with an existing instruction set, for example the PIC16 architecture, comprises a bank select accessing scheme for accessing data memory and a bank select register configured to select a memory bank. The microprocessor architecture comprises an instruction set having a dedicated instruction for selecting a memory bank. However, an opcode of the dedicated bank select instruction provides only for a limited number of bits. For example, in the PIC16 architecture, a maximum of n bits payload are available in the MOVLB instruction which loads the BSR, thereby providing for an address value which is configured to select a maximum of $2^n$ memory banks, in the PIC16 architecture 32 memory banks. According to various embodiment, an opcode of a test instruction available in the PIC16 architecture is used for loading the BSR. Such an instruction has m bits of payload which can now be used with the new bank select instruction, wherein m>n. An opcode of the old dedicated bank select instruction is no used for a new test instruction. Thus, a maximum of compatibility can be achieved. The new instruction would execute as a no-operation instruction on a conventional PIC16 microcontroller.

The PIC16 architecture provides for a test operating mode which is generally not available or used by a user. Thus, the opcode coding may reserve codes for some special instructions that are usually not available and therefore are used for the new implementation of the expanded instruction according to various embodiments. A test mode may be entered through an external programming/debugger device. Test mode makes the device available for device validation, testing and production; with a variety of operating modes that support the various test requirements. For example, a voltage applied to the MCLR pin may determine which type of test mode is to be entered. One of the available test instructions can be, for example, a Set Control instruction that updates simulation states in a simulation environment and is not functional during normal operation, thus, in a conventional microcontroller this instruction executes like a no-op instruction unless the device is in the test operating mode. The Set Control instruction executes in a simulation environment. Dedicated signals are defined, and the instruction loads a value to those signals.

Other test instructions can be, for example, an external execution data out mode selection instruction. This instruction may perform in a submode of the normal test mode, which is entered through the programming interface and it alters how data is transferred, allowing faster execution or more detail in data read-out. There may be a variety of other test instructions available that execute as a no operation instruction in normal operating mode.

Figure 1:
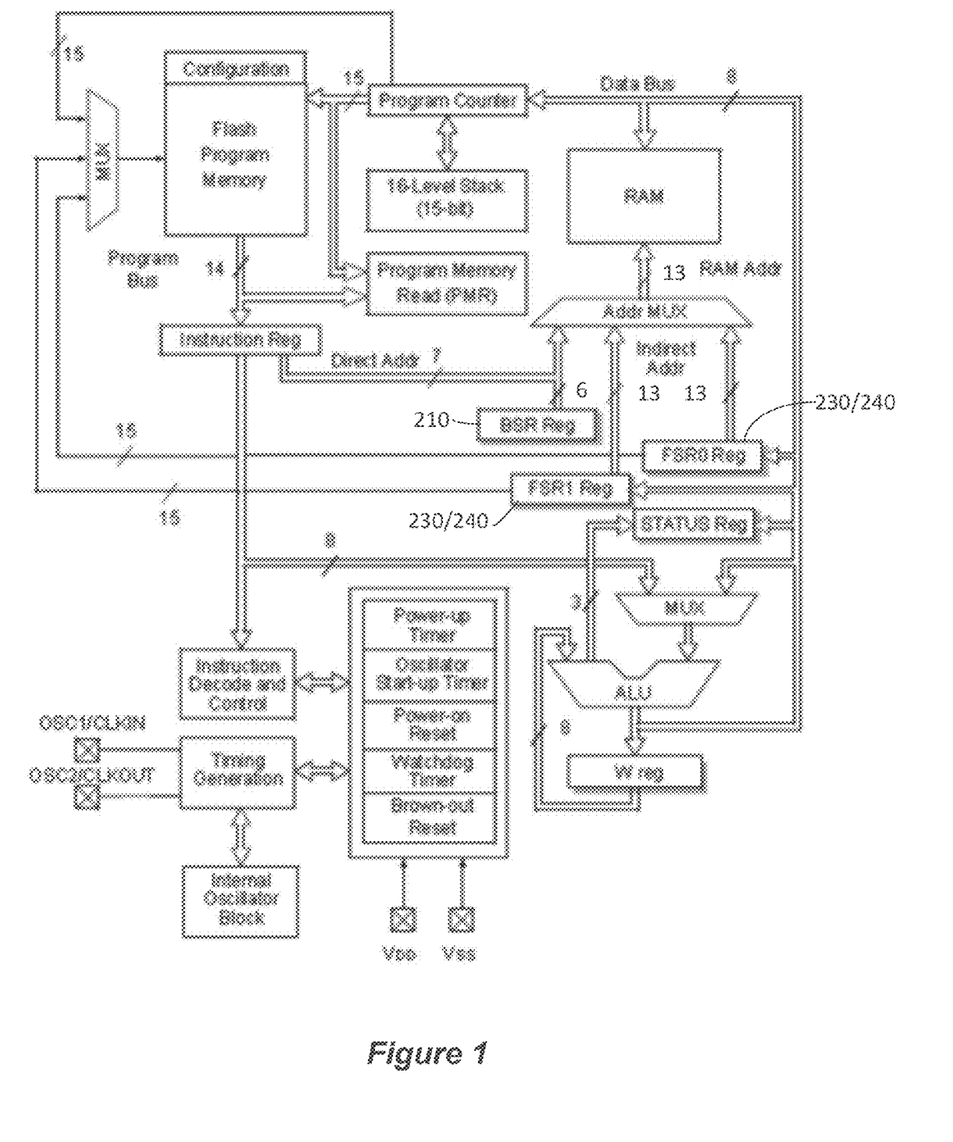
FIG. 1 shows a block diagram of an 8-bit microprocessor core according to an embodiment.
Figure 1A:
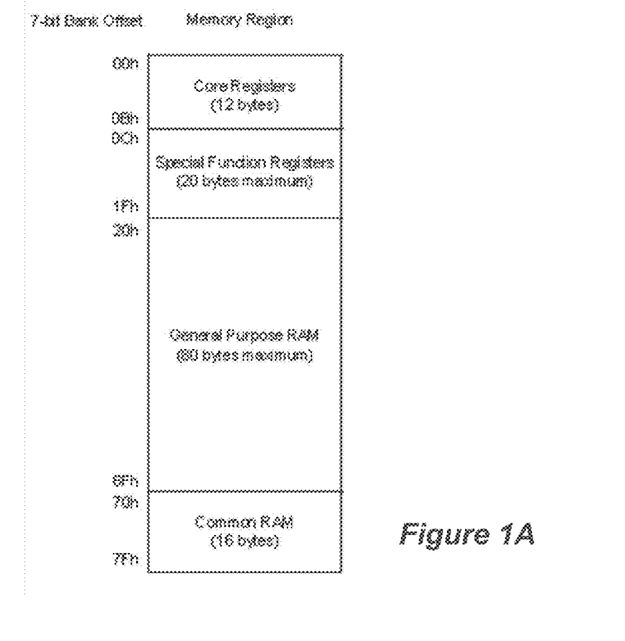
FIG. 1A shows an embodiment of how a data memory bank is structured.

FIG. 1 shows a banking architecture of an enhanced microcontroller core according to various embodiments, for example a core designed according to the PIC16 architecture. In this improved embodiment, a 6-bit bank select register 210 (BSR) has been implemented that provides for 1 additional bit with respect to conventional designs allowing a selection of 64 memory banks. The instruction register can provide up to 7 bits for a direct address which allows 128 memory locations per selected memory bank. FIG. 1A shows an exemplary memory bank. According to the shown scheme, the first 12 bytes are mapped to core registers and available in each memory bank. The core registers are registers that are most important for a user and therefore accessible in each memory bank. A subset of these registers or all of them may define a current context that is saved in case of an exception, such as for example an interrupt. The next 20 memory locations in a bank are reserved for up to 20 memory mapped special function registers. Addresses 20h to 6Fh comprise 80 bytes of general purpose RAM. Depending on the overall size of the RAM, these addresses are mapped to the Ram and available as general purpose RAM. Thus, some embodiments will use all 80 bytes in all memory banks whereas embodiments with less memory will leave some of the upper banks empty. Addresses 70h to 7Fh are reserved for a so-called common RAM. Thus, each bank is mapped to the same 16 physical data memory locations. Thus, a user can have up to 16 bytes that are always available no matter which bank has been selected. The scheme does not need to be followed for all banks.

Generally, the core registers and the common RAM may be used for all memory banks. However, according to some embodiments, some of the upper banks may not map any special function registers to the addresses 0Ch to 1Fh. Also, some banks may use the addresses 0Ch to 6Fh exclusively or mostly for special function registers depending on the implemented peripheral devices. The scheme as shown in FIG. 1A allows for up to 64×20=1280 special function register locations as well as 12 core registers.

A conventional instruction that selects a memory bank, such as the instruction MOVLB of the PIC16 microcontroller allows to set the bank select register BSR with 5 bits. It is typically encoded as 00 0000 001kkkkk according to the PIC16 architecture, wherein k represents the 5-bit value written into the BSR. This encoding does not allow a simple expansion to 6 bits because the existing BSR instruction payload of the conventional instruction word is not sufficient to hold a 6-bit BSR value.

According to various embodiments, in order to increase RAM capacity above 2 kbytes, an additional bit is required in the address bus and a BANKSEL instruction has to be implemented to have an additional bit in the payload.

Figure 2:
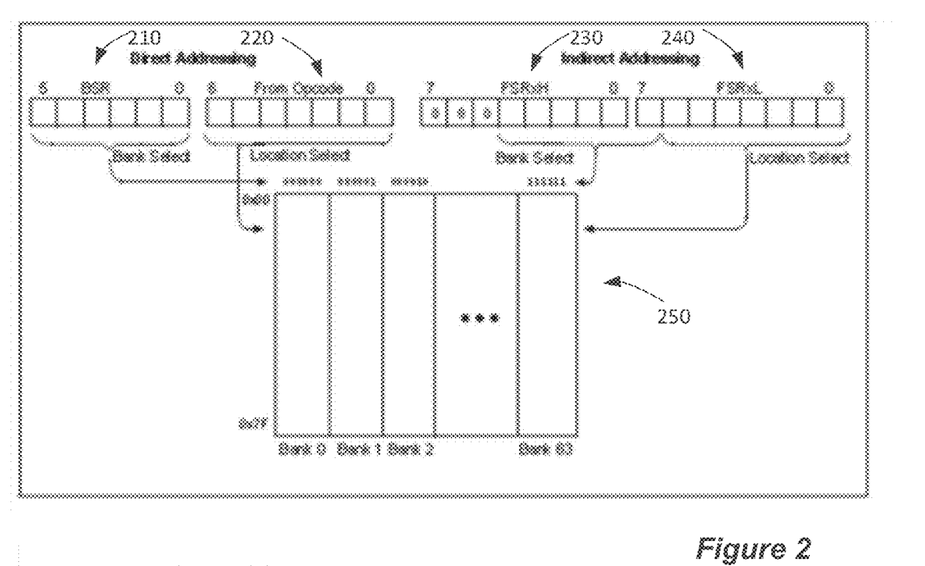
FIG. 2 shows a data memory access scheme according to various embodiments.

As shown in FIG. 2, the BSR 210 provides the upper-most bits of the SRAM/SFR address bus. The conventional banking scheme is extended by the addition of a single bit, effectively doubling the addressing range according to various embodiments. Besides the update to the instruction opcode, additional changes were required, for example, to expand the in-circuit debugger (ICD) shadow registers. The original instruction field, however, did not lend itself to easily increasing the payload size, so according to various embodiments, a new opcode structure has been designed.

As shown in FIG. 2, 64 banks can be selected by a new instruction, wherein the bank select register 210 (BSR) comprises 6 bits. Both addressing modes, direct and indirect, are extended to a range of 8 kBytes total by providing 13 bits. The indirect addressing is performed by programming two 8-bit registers 230, 240 FSRxH and FSRxL whose content is concatenated to provide for an extended address range that is capable of addressing the entire data memory space 250. To this end, the higher indirect address register 230 FSRxH is expanded to provide for an additional bit, now concatenated registers 230 and 240 providing 13-addressing bits. For direct addressing, the bank select register 210 now provides for 6 bits which is combined with the 7-bit from the opcode 220 thereby also providing 13 addressing bits.

The new architecture has the advantages of: 64 banks allowing for up to 4 k bytes of actual general purpose user RAM (GPR), wherein each bank contributes up to 80 general purpose registers when using the scheme according to FIG. 1A. Moreover, each bank may comprise 20 memory location that are memory mapped to a special function register (SFR). However, some banks may provide for up to 100 SFsR. Thus, the microcontroller can provide for up to 64*20=1280 SFRs for most devices or, for example, 6*100 SFRs in the upper-most banks which results in up to 1760 SFRs. Other configurations with even more or less SFRs are possible. A microcontroller according to various embodiments can therefor provide for up to 4 kB of general purpose registers (general purpose memory) and up to 1760 SFR can be provided.

The PIC16 microcontroller architecture uses a 14-bit instruction code. Thus, encoding is limited with respect to other designs. According to various embodiments, to be compatible with conventional PIC16 microcontrollers, a new BSR instruction uses the encoding of another instruction that in a conventional PIC16 architecture is used for test purposes, for example, the SETCNT test instruction. This instruction execute a NOP in a conventional PIC16 microcontroller when operated in normal operation mode. The encoding is: 00.0001.01bb.bbbb, wherein b represents the new bank value.

The new SETCNT is the old BSR. The encoding will be 00.0000.001b.bbbb. No new opcodes were allocated by this change.

Figure 4B:
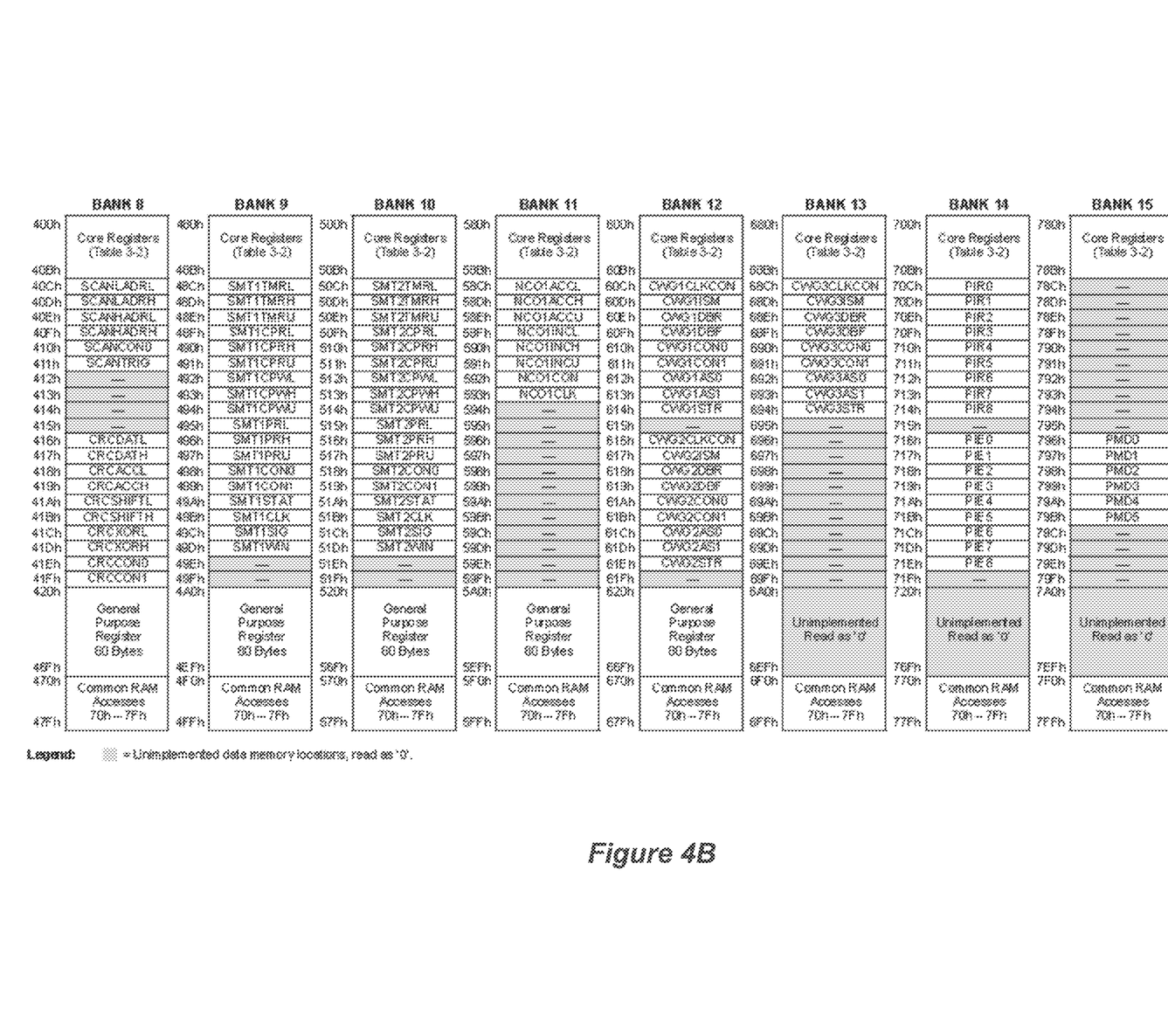
Figure 4D:
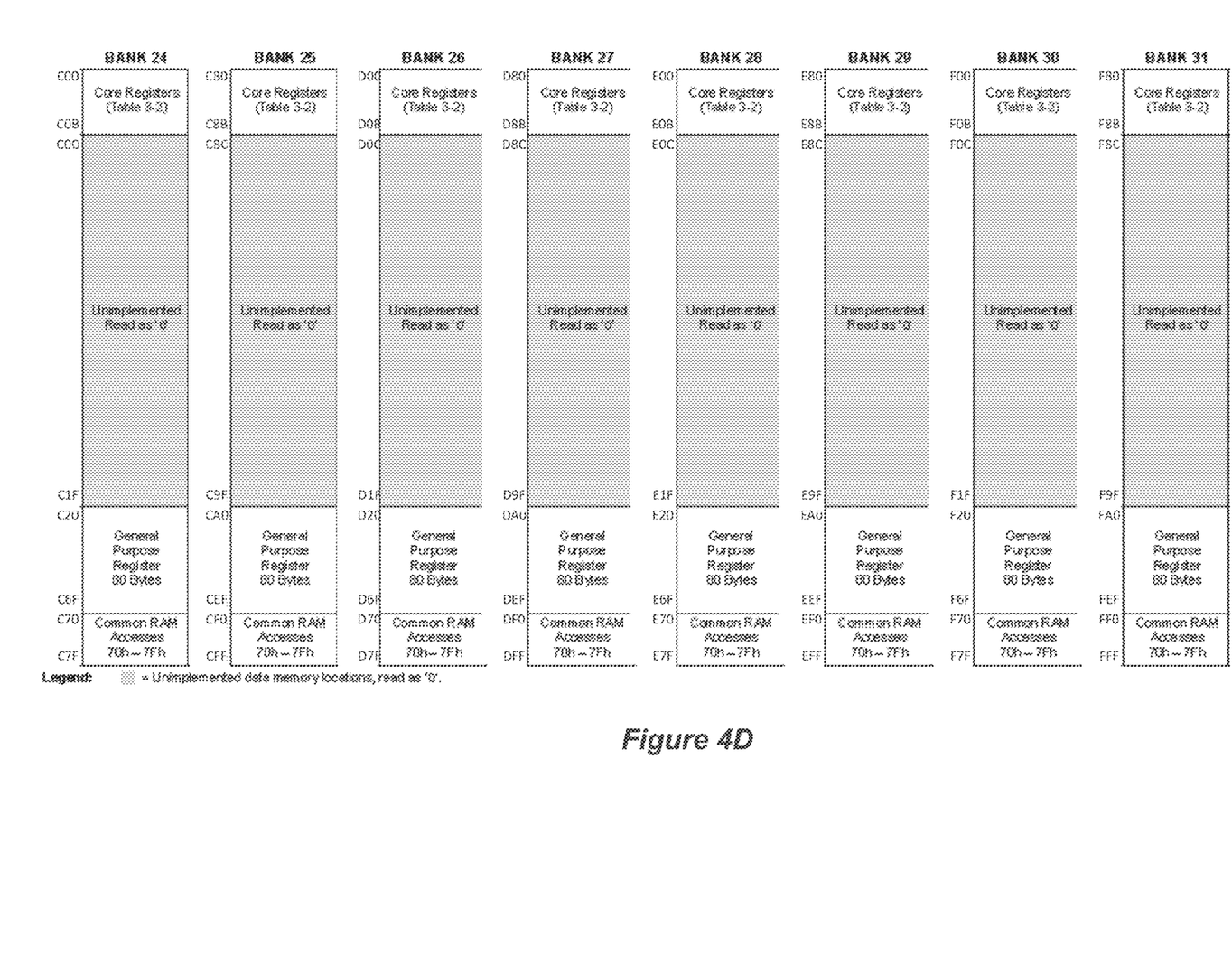
Figure 5C:
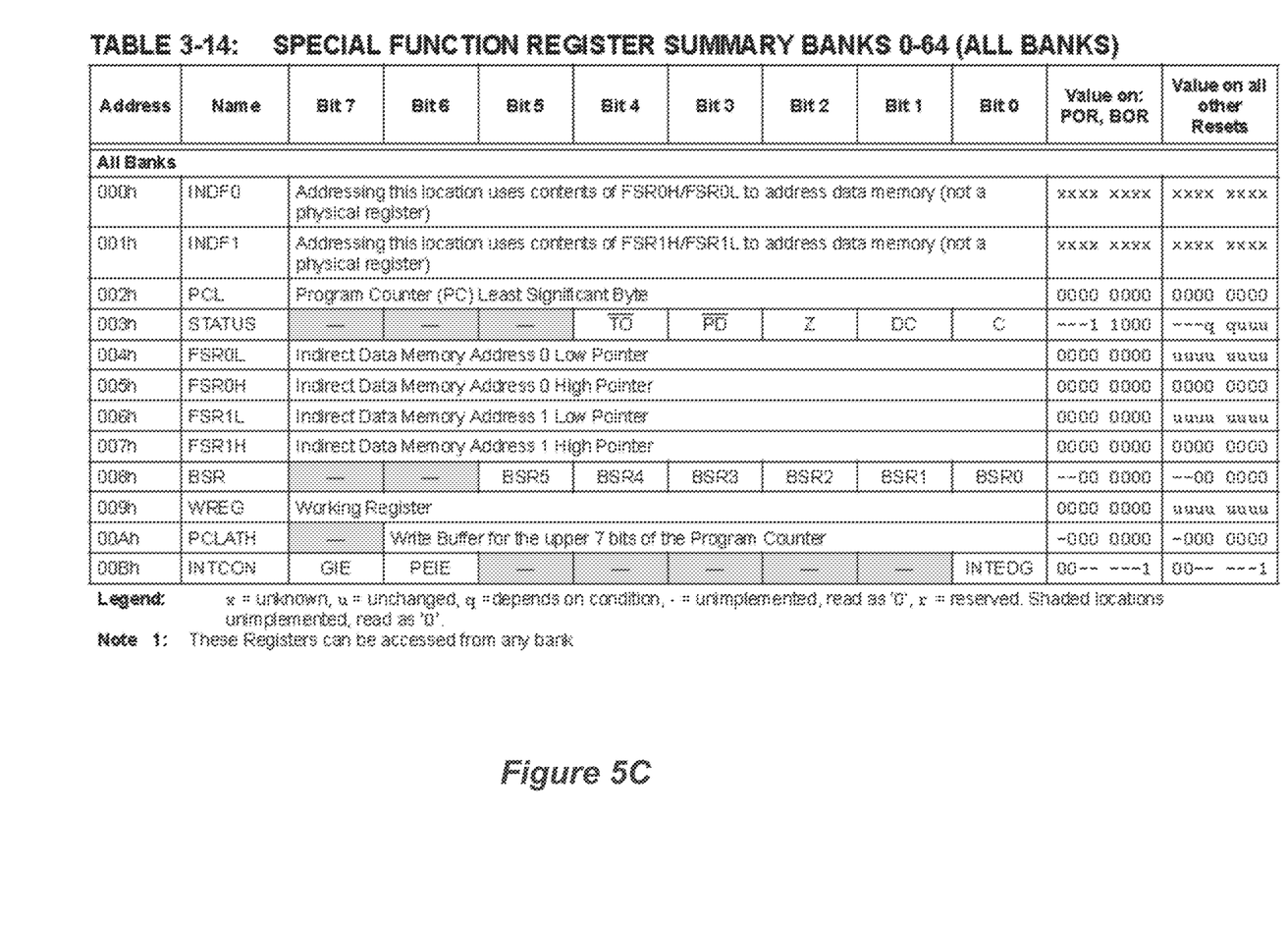
FIG. 5C show a mapping of the 12 core registers.

FIGS. 3A and 3B show the entire instruction set for the improved microcontroller. FIG. 4A to 4E show one example of a microcontroller using the PIC16 architecture with a RAM divided into an expanded 64 memory banks. In this embodiment, as shown in FIGS. 4A and 4B, the first 13 banks use all available 80 bytes of general purpose registers wherein the first bank comprises 96 GPRs as it also provides for the common RAM that is available in all banks. FIGS. 4D and 4C shows that some memory banks 13-23 may not provide for GPRs wherein banks 13-19 provide additional SFRs. FIG. 4D shows that memory bank 24-31 provide each 80 bytes of GPRs. FIG. 4E shows that memory banks 32-50, 54, 56-58, and 60-62 provide each 80 bytes of GPRs wherein some memory banks, here banks 32-59, may or may not memory map any SFRs. These mappings are merely examples and other implementations may be possible as will be appreciated by a person skilled in the art. The last four memory banks 60-63 are shown in more detail in FIGS. 5A and 5B. FIGS. 5A and 5B show additional special function register mapping. As can be seen in FIG. 5A, memory bank 60 and 61 memory map certain SFRs, here for the configurable logic cells and other peripherals. Memory bank 63 also provides eight memory mapped shadow registers for the core registers as well as the stack pointer and table pointers. The eight shadow registers are used to save a current context as explained above. As can be seen the context consists of 8 of the core registers in this example. FIG. 5A shows that bank 63 has no general purpose registers except for the common RAM. FIG. 5B shows two different embodiments for different microcontroller implementations for memory bank 62. FIG. 5C shows the first 12 core registers of each bank in more detail. All banks have the common RAM area at the bottom addresses even though FIGS. 5A and B do not show them. Again, FIGS. 4A to 4E and 5A, B are merely examples of specific memory mappings of core registers, special function registers, and general purpose registers. Other mappings may apply depending on the requirements of the specific microcontroller and its peripherals.

The invention claimed is:

1. A method for expanding a data memory for an existing microprocessor architecture comprising a bank select accessing scheme for accessing data memory which is divided into a plurality of memory banks and a bank select register configured to select a memory bank and wherein the existing microprocessor architecture comprises an instruction set having a dedicated instruction for selecting a memory bank; wherein an opcode of the dedicated bank select instruction provides for a maximum of n bits payload thereby providing for an address value which is configured to select a maximum of $2^n$ memory banks, wherein no additional opcode is added to the instruction set and wherein a processor of the existing microprocessor architecture is configured to operate in a normal operation mode or in a test mode; the method comprising the steps of:
   using an opcode of a test instruction that provides for m bits of payload for a new bank select instruction, wherein m>n, wherein the test instruction is a control instruction that updates simulation states when said processor of the existing microprocessor architecture operates in the test mode; and
   using an opcode of the dedicated bank select instruction for a new test instruction that updates simulation states when operating in the test mode.

2. The method according to claim 1, wherein the new test instruction executes as a no operation instruction during normal operation of the microprocessor and performs said simulation state update when operating in the test mode.

3. The method according to claim 1, wherein n=5 and m=6.

4. The method according to claim 1, wherein at least a subset of the plurality of memory banks each comprises a plurality of core registers, a plurality of memory-mapped special function registers, a plurality of general purpose registers and a plurality of common general purpose registers, wherein the common general purpose registers and the core registers are mapped to each memory bank.

5. The method according to claim 4, wherein each of the memory banks provides address space for up to 12 core registers, up to 20 special function registers, up to 80 general purpose registers, and up to 16 common general purpose registers.

6. The method according to claim 1, wherein some memory banks comprise only core registers, special function registers, and common general purpose registers, wherein the common general purpose registers and the core registers are mapped to each memory bank.

7. The method according to claim 1, wherein some memory banks comprise only special function registers, and common general purpose registers, wherein the common general purpose registers are mapped to each memory bank.

8. The method according to claim 1, wherein some memory banks comprise only common general purpose registers, wherein the common general purpose registers are mapped to each memory bank.

9. The method according to claim 1, wherein a first subset of memory banks comprise core registers, special function registers, general purpose registers, and common general purpose registers,
wherein a second subset of memory banks comprise only core registers, special function registers, and common general purpose registers,
wherein a third subset of memory banks comprise only special function registers, and common general purpose registers,
wherein a fourth subset of memory banks comprise only common general purpose registers, and
wherein the common general purpose registers and the core registers are mapped to each memory bank.

10. The method according to claim 1, wherein the entire data memory can be accessed through two concatenated indirect address registers.

11. The method according to claim 10, wherein a first indirect address register comprises a lower eight address bits and a second indirect address register comprises an upper 5 address bits.

12. The method according to claim 1, wherein the microprocessor architecture is implemented in a microcontroller comprising a plurality of peripherals which are controlled by special function registers, wherein the special function registers are memory mapped to the data memory.

13. The method according to claim 12, wherein the microcontroller comprises up to 1760 special function registers.

14. The method according to claim 12, wherein the data memory has a size of 4 kBytes.

15. A method for expanding a data memory for an existing microprocessor architecture comprising a bank select accessing scheme for accessing data memory which is divided into a plurality of memory banks and a bank select register configured to select a memory bank and wherein the existing microprocessor architecture comprises an instruction set having a dedicated instruction for selecting a memory bank; wherein an opcode of the dedicated bank select instruction provides for a maximum of n bits payload thereby providing for an address value which is configured to select a maximum of $2^5$ memory banks, wherein no additional opcode is added to the instruction set and wherein a processor of the existing microprocessor architecture is configured to operate in a normal operation mode or in a test mode; the method comprising the steps of:
using an opcode of a test instruction that provides for 6 bits of payload for a new bank select instruction, wherein the test instruction is a control instruction that updates simulation states when said processor of the existing microprocessor architecture operates in the test mode and wherein the test instruction executes as a no operation instruction during normal operation of the microprocessor; and
using an opcode of the dedicated bank select instruction for a new test instruction that updates simulation states when operating in the test mode,
wherein at least a subset of the plurality of memory banks each comprises a plurality of core registers, a plurality of memory-mapped special function registers, a plurality of general purpose registers and a plurality of common general purpose registers, wherein the common general purpose registers and the core registers are mapped to each memory bank.

16. The method according to claim 15, wherein some memory banks comprise only core registers, special function registers, and common general purpose registers, wherein the common general purpose registers and the core registers are mapped to each memory bank.

17. The method according to claim 15, wherein some memory banks comprise only special function registers, and common general purpose registers, wherein the common general purpose registers are mapped to each memory bank.

18. The method according to claim 15, wherein some memory banks comprise only common general purpose registers, wherein the common general purpose registers are mapped to each memory bank.

19. The method according to claim 15, wherein a first subset of memory banks comprise core registers, special function registers, general purpose registers, and common general purpose registers,
wherein a second subset of memory banks comprise only core registers, special function registers, and common general purpose registers,
wherein a third subset of memory banks comprise only special function registers, and common general purpose registers,
wherein a fourth subset of memory banks comprise only common general purpose registers, and
wherein the common general purpose registers and the core registers are mapped to each memory bank.

* * * * *